United States Patent [19]

Lang

[11] Patent Number: 4,883,629
[45] Date of Patent: Nov. 28, 1989

[54] PROCESS FOR THE PRODUCTION OF DIMENSION-STABLE POLYESTER TIRE CORD

[75] Inventor: Bruno Lang, Ballwil, Switzerland

[73] Assignee: Viscosuisse SA, Emmenbruücke, Switzerland

[21] Appl. No.: 259,510

[22] Filed: Oct. 14, 1988

Related U.S. Application Data

[63] Continuation of Ser. No. 870,311, Jun. 3, 1986, abandoned.

[30] Foreign Application Priority Data

Jun. 19, 1985 [CH] Switzerland .............................. 02597

[51] Int. Cl.$^4$ ................................................ D02J 1/22
[52] U.S. Cl. ............................... 264/289.6; 264/290.5; 264/342 RE
[58] Field of Search ............ 264/290.5, 289.6, 342 RE

[56] References Cited

U.S. PATENT DOCUMENTS

| | | | |
|---|---|---|---|
| 3,838,561 | 10/1974 | Munting | 57/140 R |
| 3,966,867 | 6/1976 | Munting | 264/210 |
| 4,003,974 | 1/1977 | Chantry et al. | 264/289.6 |
| 4,070,432 | 1/1978 | Tomaddon | 264/342 RE |
| 4,101,525 | 7/1978 | Davis et al. | 525/309 |

FOREIGN PATENT DOCUMENTS 2022748 11/1970 Fed. Rep. of Germany .
1261337 1/1972 United Kingdom .
1419211 12/1975 United Kingdom .

Primary Examiner—Hubert C. Lorin
Attorney, Agent, or Firm—Michael J. Striker

[57] ABSTRACT

A process for the production of dimension-stable polyester cord by means of a two-stage heat treatment including initially stretching at 205°–250° C. between 3 and 7 percent, and subsequently relaxing at 205°–250° C. between 3 and 7 percent. There results a dimension-stable polyester cord displaying a shrinkage of less than 1.2 percent.

1 Claim, No Drawings

PROCESS FOR THE PRODUCTION OF DIMENSION-STABLE POLYESTER TIRE CORD

This application is a continuation of application Ser. No. 870,311, filed June 3, 1986, now abandoned.

BACKGROUND OF THE INVENTION

The invention concerns a process for the production of an impregnated, dimension-stable polyester cord, of at least 95 percent by weight polyethylene terephthalate having a limit viscosity of more than 0.70 dl/g, and having a titer of at least 1100×2 dtex, by means of a two-stage heat treatment including hot stretching and hot relaxation, whereby the stretching follows at a higher temperature than the relaxation, as well as a polyester cord produced according to this process.

Motor vehicle tires of typical construction are composed in their essential parts of a stability support in the form of cord, which is vulcanized into rubber. The external shape and, in particular, the tread, i.e., the contact surface, is determined by quite specifically composed rubber mixtures. In order for such tires to possess good operating characteristics and a long useful life, two significant conditions, among others, must be fulfilled: the tires must be very uniform in their external shape and, accordingly, remain dimension-stable indeed upon production as well as in later use and with fast driving of vehicles.

When dimension-stable products such as e.g., metal wires, are employed for stability supports, the conditions are somewhat more easily attained through precise tire construction. However, as soon as materials such as twine of high strength synthetic yarns is employed, the objective is attained only to an unsatisfactory extent, since either during or directly after the vulcanization, indeed depending upon the processing conditions, the rubber of the stability supports shrinks or lengthens, resulting in an inability to maintain the stability support under control.

Processes are known for the two-stage dipping and hot stretching of polyester yarns. For example, according to DE-AS 20 22 748, a polyester yarn as used impregnated for tires is stretched in a first stage at least eight percent at a temperature between 199° C. and 254° C., and relaxed at least seven percent in second stage at a temperature between 163° and 204° C. The resulting polyester cord displays at 160° C. a heat shrinkage not less than 5.8 percent. Whether or not the strength characteristics of such a cord are improved, the relatively high heat shrinkage causes an always still unsatisfactory dimension-stability in the prepared pneumatic tires.

The use of of a polyester filament yarn based upon at least 85 mol-percent polyethylene terephthalate in pneumatic tires is known from DE-AS 27 47 690. According to the described process, the characteristics of the yarn employed for construction are improved from previously more than 10 percent shrinkage up to between 7.8 and 5.0 percent shrinkage when they are heated. Whether or not the employment of polyester filament yarn having a pre-thermal shrinkage of about 5 percent is sufficient for many requirements, it is frequently not suitable to meet the requirements of pneumatic tires of higher demand ratings.

Such polyester filaments which shrink more than 5 percent, be it that the starting material per se already has this very high shrinkage or be it that in the course of production of the tires, directly after the vulcanization, the hot tires are subjected to high pressure (i.e., so-called post-cure inflation), are still not dimension-stable. In the course of employment their length changes, which leads to unsmooth running of the tires, since this change in length is uncontrolled.

It is therefore an object according to the present invention to make available a process for the production of an improved dimension-stable polyester cord which displays a minimal shrinkage during the vulcanization and later, during employment.

It is a further object according to the present invention to provide a process for the economical production of such dimension-stable cords having low shrinkage, sufficient initial modulus and improved fatigue resistance.

SUMMARY OF THE INVENTION

These objects are attained according to the present invention by a process for the production of an impregnated, dimension-stable polyester cord composed of at least 95 percent by weight polyethylene terephthalate and 5 percent copolymers as mentioned in DE-As 20 22 748 having a limit viscosity of more than 0.70 dl/g, and a titer of at least 1100×2 dtex, by means of a two-stage heat treatment of the polyester cord including hot stretching and hot relaxation, whereby the stretching follows at a higher temperature than the relaxation, thereby characterized in that the polyester cord is stretched in a first process step between 3 and 8 percent and relaxed in a second process step between 3 and 7 percent.

It has surprisingly been discovered that with relaxation temperatures above 205° C. an improvement occurs in the dimension-stability. A temperature range between 205° and 250° C. has proven to be expedient for the relaxation, the cord thus having to be not substantially cooled down from the stretching zone of, for example 240° C. temperature.

The thermal shrinkage measurement determined polyester cord which are prepared beforehand either directly from impregnated or calendered textile fabric or from finished pneumatic tires. Such cord filaments are permitted to shrink no more than 1.8 percent and preferably less than 1.2 percent, at 160° C., during five minutes dwell period and loaded with a pre-stress weight of 0.1 cN/tex. Such cord is characterized by the advantage that practically no uncontrolled shrinkage occurs during the vulcanization and in hot tires.

It is particularly advantageous when the cord length changes less than 1 percent during vulcanization, with a most preferred alteration in length of less than 0.3 percent. In addition, the shrinkage force expediently amounts to less than 0.7 cN/tex, preferably less than 0.4 cN/tex.

By manufacturing tires in accordance with the present invention one is relieved in a particularly advantageous manner of the previous necessity to forcibly pump out the still hot tires after the vulcanization, in order to compensate by means of after-stretching, for too great a shrinkage (post-cure inflation) and thus to bring the tires to the correct dimensions. A disadvantage of this previous procedure (post-cure inflation) is that the specific stability support is uncontrolled, which can lead to irregular construction of the tires.

It is advantageous to so select the stretching and relaxation stages that upon cord loadings of 1.5 percent extension, the tension is somewhat greater than 6.8 cN/tex, and upon 5 percent extension, somewhat greater than 12 cN/tex. These ranges lie above the typical operating ranges during practical employment of tire cords, and encourage a very good fatigue behavior conditioned upon the high stretching.

The range from 0 to 6.8 cN/tex lying thereunder remains, based upon the high initial modulus of polyester, extensively uninfluenced by the degree of relaxation, and thus guarantees high uniformity, stability and operational properties in the tires.

The best cord and cord fabric stabilities and fatigue resistances are obtained when the polyester cord is exposed to a tension of about 5 cN/tex during the hot stretching and, during the subsequent relaxation, a tension of about 1.0 cN/tex. The result thereof, indeed depending upon origin of polyester yarn employed, in impregnated or prepared, calendared cord fabric, is a thermal shrinkage of less than 1.8 percent, with prestressing of 0.1 cN/tex, preferably less than 1.2 percent, and a shrinkage force of less than 0.7 cN/tex, preferably less than 0.4 cN/tex. There results at the same time a total stretching of between 1 and 3 percent.

The fatigue resistance measured after 10.8 MC (megacycles) by means of a Disc-Fatigue-Tester with 6 percent stretching and 6 percent compression, lies 5–20 percent higher than conventionally-treated polyester cord which is worked up into PCI-treated tires. The result thereof is a considerably higher useful life of the tires.

A so-treated polyester cord, in tires at operational pressure, with temporary operational temperatures up to 100° C., and measured in a cooled state, remains stretched no more than 1.5 percent and is therewith sufficiently dimension-stable.

According to a preferred process of production for the cord according to the present invention, the polyester filaments having a limit viscosity between 0.70 and 1.0, worked up beforehand into crude cord by spinning and conventional techniques known per se, are heat-stretched in a first process step at a temperature from 220°–250° C., preferably at 240° C., under high tension, between at least 3 percent and at most 8 percent, preferably 4–7 percent. In a second process step, at 190°–250° C., preferably at 210° C., they are relaxed at most 7 percent and at least 3 percent. The result is a net stretching of around 5 percent, preferably less than 1 percent.

The novel features which are considered characteristic for the invention are set forth in particular in the appended claims. The invention itself, however, both as to tis construction and its method of operation, together with additional objects and advantages thereof, will be best understood from the following description of specific embodiments.

DESCRIPTION OF THE PREFERRED EMBODIMENTS

EXAMPLE 1

A polyester cord of LS-polyester, dtex 1100×2 with 470/470 tpm twine is stretched during a period of 45 seconds and at a temperature of 240° C. about 7 percent, and relaxed during a period of 50 seconds and at a temperature of 210° C. about 0 percent. The result is that, upon 1.5 percent stretching, a tension of 25N or 10.0 cN/tex and a thermal shrinkage at 160° C. of 5.1 percent with 420 cN shrinkage force.

EXAMPLE 2

The cord according to Example 1 is, in otherwise similar manner, stretched about 7 percent during a period of 45 seconds, and relaxed about 3 percent during a period of 50 seconds. The cord provides, as a result, at 1.5 percent stretching, a tension of 22N or 8.7 cN/tex and a thermal shrinkage at 160° C. of 2.5 percent with 210 cN shrinkage force.

EXAMPLE 3

The cord according to Example 1, in otherwise similar is stretched during a period of 45 seconds about 7 percent and relaxed during a period of 50 seconds about 7 percent. The result is that with 1.5 percent stretching one observes a tension of 19N or 7.2 cN/tex and a thermal shrinkage at 160° C. of 0.8 percent with 88 cN shrinkage force.

EXAMPLE 4 (comparison example)

The cord according to Example 1 is neither stretched nor relaxed, known as the classical 0% stetch/0% relaxation procedure. The result is that with 1.5 percent strain a tension of 20N or 7.6 cN/tex is observed and a thermal shrinkage at 160° C. of 2.2 percent with 220 cN shrinkage force is measured.

The polyester cord according to the present invention provides, in comparison to the previously employed standard polyester types for tire cords, an improvement in the dimension-stability which is comparable to that demonstrated by rayon cords. The best dimension-stability, strength and fatigue-resistance for tire cords or for tire cord fabrics are attained according to the present invention when the cord fabrics are stretched as much as possible during impregnation and subsequently relaxed as much as possible. The polyester cord according to the present invention includes all cord dimensions in the titer range from dtex 2200 up to dtex 6000.

The textile fabric prepared in this manner is particularly suitable for tires, conveyor belts, drive belts and hoses, on account of its rayon-like uniformity, dimension-stability and low hysteresis.

It will be understood that each of the elements described above, or two or more together, may also find a useful application in other types of cords and cord-production processes differing from the types described above.

While the invention has been illustrated and described as embodied in a process for the production of an impregnated, dimension-stable polyester cord as well as a polyester cord prepared according to the process, it is not intended to be limited to the details shown, since various modifications and structural changes may be made without in any way departing from the spirit of the present invention.

Without further analysis, the foregoing will so fully reveal the gist of the present invention that others can, by applying current knowledge, readily adapt it for various applications without omitting features, that from the standpoint of prior art fairly constitute essential characteristics of the generic or specific aspects of this invention.

What is claimed as new and desired to be protected by Letters Patent is set forth in the appended claims:

1. Process for the production of dimension-stable polyester tire cord, comprising of at least 95 percent by weight of polyethylene terephthalate having a limit viscosity of more than 0.70 dl/g and a titer of at least dtex 1100×2, by means of a heat treatment of the polyester cord, including hot stretching and hot relaxation, the stretching effected at a higher temperature than the relaxation, wherein the polyester tire cord is stretched between 3 and 7 percent in a first process step, and the polyester tire cord is relaxed between 3 and 7 percent in a second process step at a temperature between 205°–250° C. resulting in a total stretching of less than 5%.

* * * * *